United States Patent [19]

Torpie

[11] 3,919,476

[45] Nov. 11, 1975

[54] TIME DEPENDENT TWO-TO-THREE LEVEL ALTERNATE ENCODING

[75] Inventor: John D. Torpie, Dallas, Tex.

[73] Assignee: Xerox Corporation, Stamford, Conn.

[22] Filed: May 30, 1974

[21] Appl. No.: 474,752

[52] U.S. Cl. ........... 178/68; 178/DIG. 3; 325/38 A; 307/209

[51] Int. Cl.[2] ............................................ H04N 7/00

[58] Field of Search .............. 178/6, DIG. 3, 66, 68; 325/38 A; 307/209

[56] References Cited

UNITED STATES PATENTS

| | | | |
|---|---|---|---|
| 3,671,959 | 6/1972 | Amano | 325/38 A |
| 3,795,765 | 3/1974 | DeGroat et al. | 178/DIG. 3 |
| 3,806,639 | 4/1974 | Evans | 178/DIG. 3 |

*Primary Examiner*—George H. Libman

[57] ABSTRACT

To provide spectrum compression for non-synchronous data signals of the type that make successive excursions from a predetermined level, there is a method and means for carrying out a modified two-to-three level alternate encoding technique whereby the polarity of the encoded signal is changed or retained from one excursion of the data signal to the next depending on whether the excursions occur within a predetermined period of time or not. To gain the full advantage of this technique in limited bandwidth facsimile systems, the timing is selected so that adjacent runs of white picture elements are encoded with opposite or identical polarities depending on whether the intervening black run contains one or more picture elements, thereby virtually forcing the system to respond to any single, isolated, black picture elements.

21 Claims, 4 Drawing Figures

TIME DEPENDENT TWO-TO-THREE LEVEL ALTERNATE ENCODING

BACKGROUND OF THE INVENTION

This invention relates to the transmission of non-synchronous data signals over limited bandwidth transmission channels and, more particularly, to methods and means for compressing the spectrum of non-synchronous facsimile signals.

The mounting demand for rapid and accurate communications of graphic information (e.g., written and printed material, drawings, sketches, etc.) has led to the development of facsimile systems which are capable of providing a remote location with a more or less exact replica or "facsimile" of a subject copy in a matter of just a few minutes. To that end, the typical facsimile system includes a transmitting terminal for converting the information content of the subject copy into a video signal, a transmission channel for carrying that signal (or, more commonly, a carrier modulated in accordance with it) to the remote location, and a remotely located receiving terminal for printing the facsimile copy in response to the video signal.

Document transmission time and resolution are important performance parameters of such systems. The first is a measure of the amount of time required for generating the facsimile copy, and the other is a measure of the quality of that copy. Ideally, the document transmission time is minimized and the resolution is maximized. Generally, however, those goals are inconsistant because facsimile communications are usually carried out over limited bandwidth transmission channels. For example, the public switched telephone network has become a favored transmission media for facsimile because subscribers may rely on it for a communications link to or from almost any point. Those links are, however, bandwidth limited. For example, the usual voice grade telephone link has an available bandwidth of only 3 KHz. or so.

Nyquist's rule dictates the maximum permissible data transmission rate for a limited bandwidth channel. A generalized expression of that rule for a low pass channel is:

$c/f_1 = 2 \log_2 b$ bits per second/cycle of bandwidth where:

$c$ = bits per second;

$f_1$ = the cut-off frequency of the channel; and $b$ = the number of discrete signalling levels for the data The equivalent expression for a full sideband carrier system is:

$c/f = log_2 b$ bits per second/cycle of bandwidth

Others seeking improved transmission efficiencies for facsimile and the like have proposed so-called spectrum compression techniques involving two-to-three level pretransmission encoding and three-to-two level post-transmission decoding. Specifically, random alternate encoding and dibinary encoding have both been used with some success for compressing the spectrum of non-synchronous two level data, such as facsimile signals, so that increased data transmission rates can be realized, without violating Nyquist's rule.

Random alternate encoding is carried out by reversing the polarity of the encoded signal in response to each successive excursion of the original signal from its reference level of, say, 0 volts. It yields only a slight degree of spectrum compression for the usual facsimile signal, but it provides substantial assurance that the reference level portions of the original signal will be recovered during the decoding process. Indeed, the rules for this type of encoding ensure that the reference level portions of the original signal reside between opposite polarity portions of the encoded signal, thereby virtually forcing a response to those first mentioned portions of the signal.

The rules for dibinary encoding, on the other hand, call for random selection of the polarity for the encoded signal in response to each successive excursion of the original signal from its reference level. The reference level portions of the original signal are unaffected by the encoding process. Moreover, there is an even probability that the counterpart in the encoded signal for anyone of the excursions of the original signal will be positive or negative relative to the reference level. Substantial spectrum compression is, therefore, achieved inasmuch as the encoded signal has only one half of the bandwidth of the original signal, regardless of the power density spectrum of the original signal. However, there is no assurance that the reference level portions of the original signal will be recovered during the decoding process. The problem is that the polarity of the encoded signal may remain unchanged while the original signal is making two or more sequential excursions from its reference level, thereby creating a risk in a limited bandwidth environment of a non-response to the intervening reference level portion of the signal, especially if there is only a short period of time separating the two excursions.

SUMMARY OF THE INVENTION

In contrast with the prior art, an important object of the present invention is to provide methods and means for carrying out a two-to-three level encoding process which yields substantial spectrum compression while aiding in preserving the information content of the encoded signal. In other words, an object is to provide a two-to-three level encoding technique which combines the desirable features of random alternating encoding and dibinary encoding.

More particularly, an object of this invention is to provide methods and means for encoding non-synchronous facsimile signals in accordance with a two-to-three level encoding rule which not only provides substantial spectrum compression but which also ensures that single black elements are easily and reliably recovered from the encoded signal.

Another object of the instant invention is to provide reliable and readily implemented methods and means for carrying out a two-to-three level encoding process having the aforementioned characteristics.

Specifically, an object of this invention is to provide an alternative to the two-to-three level encoding technique described and claimed in a concurrently filed and commonly assigned United States patent application, Ser. No. 474,751 on "Non-Synchronous Duobinary Encoding."

Briefly stated, to achieve these and other goals of the invention, a time dependent, two-to-three level encoding technique has been provided for encoding data signals of the type that make successive excursions from, say, a reference level. This approach, like others, provides an encoded signal having a mid-level for the reference level portions of the data signal and upper and lower levels for the so-called excursions. In accordance with this invention, however, the encoding polarity is changed or retained from one excursion to the next depending on whether those excursions occur within a predetermined period of time or not.

To take full advantage of this invention for encoding a non-synchronous baseband signal in a limited bandwidth facsimile system, the mid-level of the encoded signal is devoted to the black picture elements of the baseband signal and successive runs of white picture elements are encoded with the same or opposite polarities depending on whether they are separated by at least two black picture elements or not. The result is that white runs straddling any single, isolated, black picture element are encoded with opposite polarities, thereby virtually forcing the system to respond to the least significant bits of image information.

BRIEF DESCRIPTION OF THE DRAWINGS

Still further objects and advantages of the present invention will become apparent when the following detailed description is read in conjunction with the attached drawings, in which.

DETAILED DESCRIPTION OF THE ILLUSTRATED EMBODIMENT

While the invention is described in some detail hereinafter with specific reference to an examplary embodiment, it is noteworthy that there is no intent to limit it to that embodiment. On the contrary, the aim is to cover all modifications, alternatives, and equivalents falling within the spirit and scope of the invention as defined by the appended claims.

Figure 1:
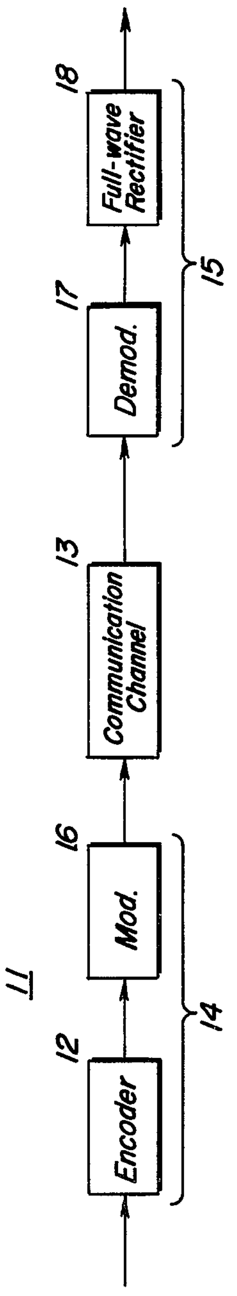
FIG. 1 is a block diagram of a limited bandwidth facsimile system in which the encoder of this invention may be used to advantage.

Turning now to the drawings, and at this point especially to FIG. 1, it will be seen that there is a limited bandwidth facsimile system 11 having a two-to-three level encoder 12 constructed in accordance with the present invention. As shown, the facsimile system 11 comprises a limited bandwidth communications channel 13 for interconnecting a transmitting terminal 14 and a receiving terminal 15. Conventionally, the communications channel 13 is provided on a demand basis by, say, the public switched telephone network. To simplify this disclosure, however, attention will be focused on the conditions existing while facsimile communications are taking place.

Specifically, in operation, the information content of a subject copy (not shown) is converted (by means not shown) into a baseband video signal. That signal is encoded by the encoder 12, and the encoded signal is then applied to a modulator 16 so that the output from the transmitting terminal 14 is a carrier signal modulated in accordance with the encoded baseband signal. The modulated signal is routed to the receiving terminal 15 by the communications channel 13. There, a demodulator 17 recovers the encoded baseband signal from the modulated carrier, a decoder 18 then recovers the baseband signal from the encoded signal, and finally a printer (not shown) prints a facsimile of the subject copy in response to the received baseband signal.

The encoder 12 is unique, but the decoder 18 may be a conventional three-to-two level decoder, such as a full wave rectifier. Indeed, no special changes need be made to existing facsimile systems and the like with spectrum compression to accomodate the encoder 12.

Figure 2:
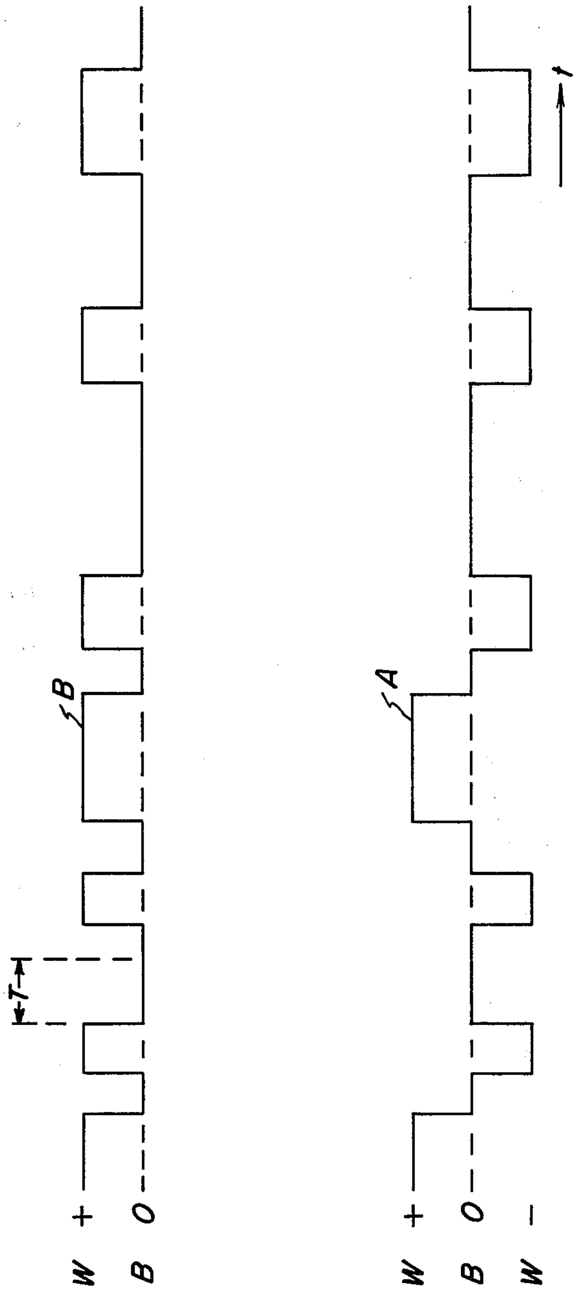
FIG. 2 is a timing chart illustrating an encoding rule which is advantageously utilized in the system shown in FIG. 1.

Referring to FIG. 2 for a generalized review of the rules for two-to-three level encoding in accordance with this invention, it will be seen that the encoded signal A swings positively or negatively from a mid-level in response to each excursion of the data signal B from its reference level, much in the same manner as with other two-to-three level encoding techniques. A distinguishing feature of the technique of this invention, however, is that the encoding polarity (i.e., the direction of the aforementioned swing) changes from one excursion to the next only if the second excursion starts within a predetermined period of time T after the first one is completed. Hence, relatively closely spaced excursions of the data signal B are encoded with opposite polarities, but others which are separated from one another by a greater amount of time are encoded with the same polarity. For that reason, the encoding technique here disclosed is conveniently referred to as "time dependent, two-to-three level alternate encoding."

As shown, the data signal B is a binary facsimile baseband signal having one voltage level for the black or image areas of the subject copy and another voltage level for the white or background areas. Nevertheless, it will be appreciated that the principles of this invention are also applicable to analog systems, such as a facsimile system having a gray scale capability.

Figure 3:
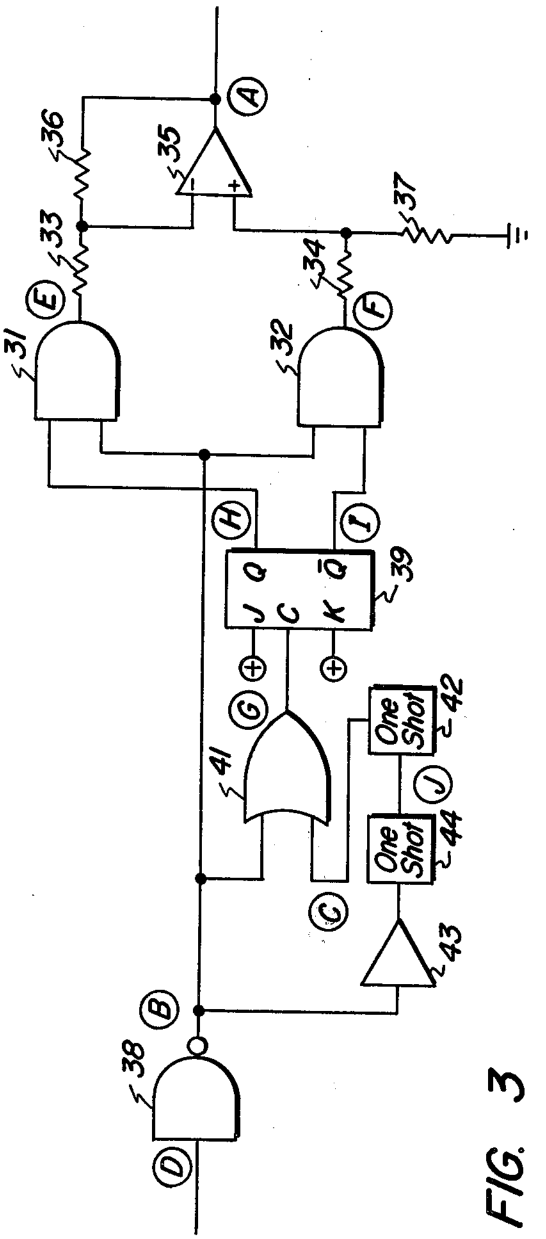
FIG. 3 is an electrical schematic of an encoder constructed in accordance with this invention.
Figure 4:
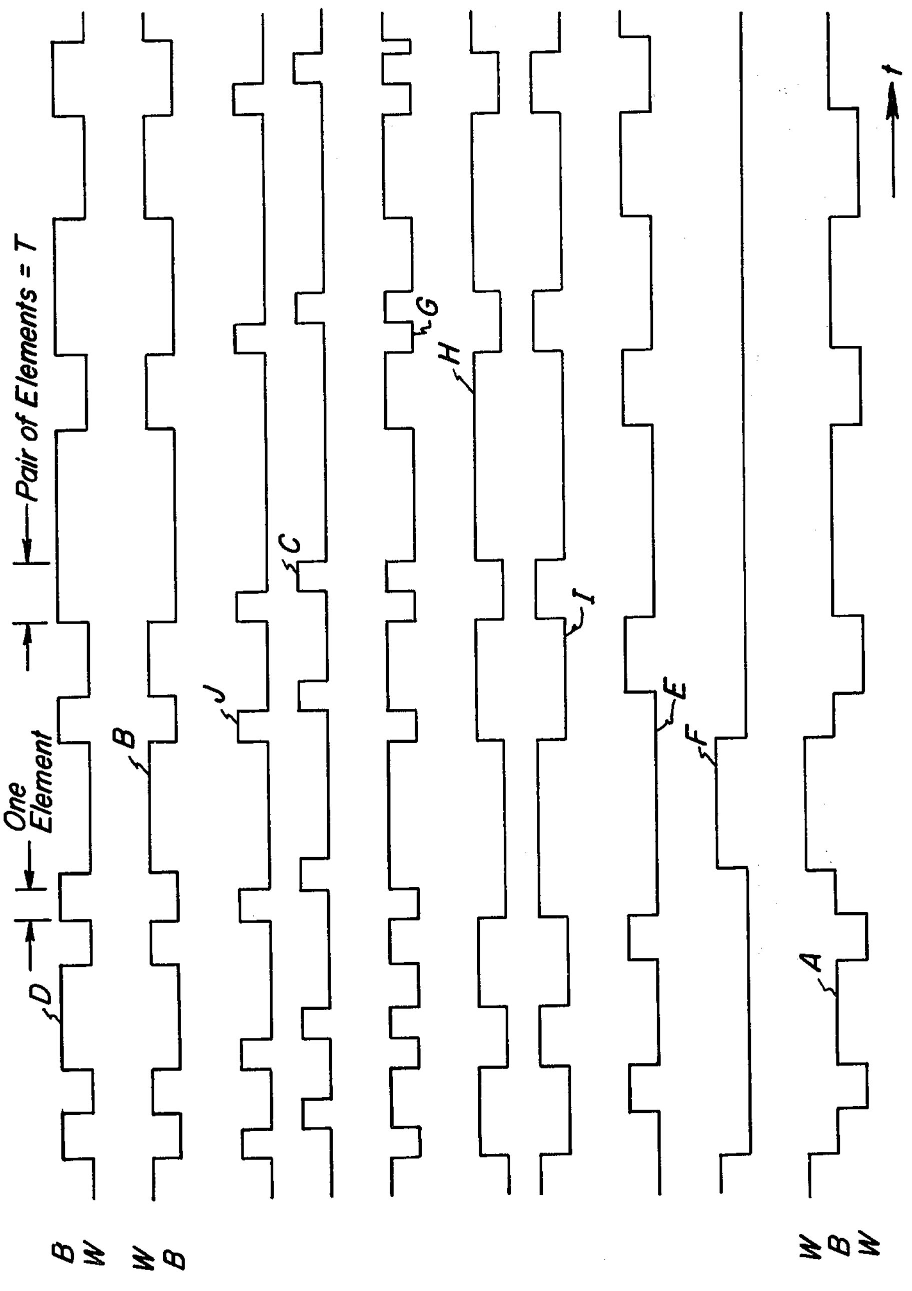
FIG. 4 is a timing chart for the encoder shown in FIG. 4.

Referring to FIGS. 3 and 4 for additional details, the input signal D for the encoder 12 is typically a classical facsimile baseband signal having a positive voltage level for the image areas (i.e., the "black" picture elements) of the subject copy and a reference, say, zero voltage level for the background areas (i.e., the white picture elements). Each picture element of the baseband signal D is, of course, allotted a predetermined amount of time. One of the most serious obstacles to faithful reproduction of the subject copy in a limited bandwidth system is the relatively high probability that the system will fail to respond to single, isolated, black picture elements. For that reason, the encoded signal A is preferably a white-black-white signal or, in other words, has its upper and lower voltage levels dedicated to the white picture elements and its mid-level dedicated to the black picture elements. Indeed, in accordance with one of the more detailed aspects of this invention, the encoding is carried out so that the white picture elements straddling any single, isolated, black picture element are encoded with opposite polarities, thereby virtually forcing the system to respond to any isolated bits of image information.

To carry out this invention, as illustrated, the encoder 12 comprises a pair of AND gates 31 and 32 which have their outputs separately coupled by resistors 33 and 34 to the inverting and non-inverting inputs, respectively, of a bipolar device, such as a unity gain operational amplifier 35. That amplifier, which characteristically has a feedback resistor 36 connected between its output and its inverting input and a drift stabilizing resistor 37 in the ground return path for its non-inverting input, is selectively operated in its inverting, non-inverting, and quiescent modes, under the control of the output signals E and F of the AND gates 31 and 32, respectively, to generate the encoded signal A.

More particularly, to achieve a white-black-white encoding format, there is an inverter 38 at the input of the encoder 12 for inverting the incoming baseband signal D. The inverted baseband signal B (like the previously mentioned and identically referenced data signal) has a positive voltage level for the white picture elements and a reference or zero voltage level for the black picture elements. As shown, that signal is applied to one input of each of the AND gates 31 and 32, thereby disabling both of those gates whenever a run of black picture elements is in progress, while permitting one or the other of them to be enabled whenever a run of white picture elements is in progress. Hence, the operational amplifier 35 operates in its quiescent mode to encode black picture elements and in either its inverting mode or its non-inverting mode to encode white picture elements.

In keeping with this invention, adjacent runs of white picture elements are encoded with opposite or identical polarities depending on whether the intervening run of black picture elements is completed within a predetermined period of time or not. To that end, a negative going control pulse G is applied to the clock input of a bistable device, such as a J-K flip-flop 39 (1) at the beginning or outset of each run of black picture elements and (2) during the course of any black run which is still in progress when the specified time period expires. The flip-flop 39 has complementary outputs Q and $\overline{Q}$ separately coupled to the remaining or second inputs of the AND gates 31 and 32, respectively. Moreover, it reverses its operating state in response to the leading edge of each of the control pulses G, thereby causing the signals H and I at its Q and $\overline{Q}$ outputs, respectively, to complementary switch from one logic level to the other, once at the outset of each black run and again during the course of any black run which is still in progress when the aforementioned time period expires. As will be appreciated, adjacent white runs are encoded with opposite or identical polarities depending on whether the flip-flop 39 reverses its operating state once or twice during the intervening black run. If there is just one change in the state of the flip-flop 39, the operational amplifier 35 will operate in its inverting mode to encode one of the white runs and in its non-inverting mode to encode the other. But, if the intervening black run is sufficiently long to satisfy the conditions for a second change in the state of the flip-flop 39, the operational amplifier 35 will operate in the same mode to encode both white runs.

To supply the negative going control pulse G for the flip-flop 39, there is an OR gate 41 having one input coupled to the output of the inverter 38 and another input coupled to the output of a one shot multivibrator 42. The inverted baseband signal B is applied to the OR gate 41 and also, by a suitable buffer 43, to the input of another one shot multivibrator 44 which, in turn, has its output coupled to the previously mentioned one shot 42. Under quiescent conditions, the output of the multivibrator 42 is at a low (0) logic level, with the result that the OR gate 41 is disabled when the inverted baseband signal B drops to its reference level to mark the outset or beginning of a run of black picture elements. The drop in the voltage level of the inverted baseband signal B does, however, trigger the one shot 44, thereby causing it to generate a positive going pulse J of predetermined duration. Moreover, the trailing edge of the pulse from the one shot 44 triggers the one shot 42 so that it supplies another positive going pulse K of predetermined duration. Accordingly, it follows that the OR gate 41 will be re-enabled and subsequently disabled during the course of any black run which is longer than the combined duration of the pulses J and K of the serially connected one shot multivibrators 42 and 44. In other words, adjacent runs of white picture elements are encoded with the same or opposite polarities depending on whether the duration of the intervening run of black picture elements is at least equal to the sum of the ON-time of the multivibrator 42 and 44 or not.

As will be appreciated, the encoding may be readily structured so that white runs straddling any single, isolated, black picture element are encoded with opposite polarities, while all other adjacent white runs are encoded with identical polarities. To accomplish that, in keeping with a detailed feature of this invention, the one shot multivibrators 42 and 44 are selected so that the sum of their ON-times equals twice the amount of time allotted to each picture element.

CONCLUSION

In view of the foregoing, it will now be apparent that this invention provides a method and means for carrying out a two-to-three level encoding process which not only yields substantial spectrum compression, but which also aids in preserving the information content of the encoded signal. It will be understood that certain aspects of the invention are especially significant to the encoding of non-synchronous baseband signals in limited bandwidth facsimile systems. At the same time, however, it will be appreciated that the broader features of the invention are not limited to any specific type of system.

What is claimed is:

1. An encoder for encoding a data signal of the type that makes successive excursions from a predetermined level, said encoder comprising the combination of bipolar means selectively operable in inverting, non-inverting, and quiescent modes; and control means coupled to said bipolar means for controlling the operating mode thereof in response to said data signal; said control means including means for holding said bipolar means in said quiescent state whenever said data signal is at said predetermined level; and timing means triggered when said data signal goes to said predetermined level for operating said bipolar means in different ones of said inverting and non-inverting modes during adjacent excursions of said data signal from said predetermined level only if the adjacent excursions occur within a predetermined period of time.

2. The encoder of claim 1 wherein said control means comprises a pair of gates, each having first and second inputs and an output; said bipolar means comprises an operational amplifier having an inverting input coupled to the output of one of said gates and a non-inverting input coupled to the output of the other of said gates; said means for holding said bipolar means in said quiescent state comprises means for applying a disabling signal to the first input of each of said gates when said data signal is at said predetermined level; and said timing means comprises a bistable device having one output coupled to the second input of one of said gates and a complementary output coupled to the second input of the other of said gates, whereby one of said gates is enabled and the other is disabled whenever said data signal departs from said predetermined level.

3. The encoder of claim 2 wherein said operational amplifier is unity gain device.

4. The encoder of claim 2 wherein said timing means further includes means for switching said bistable device from one stable state to another whenever said data signal goes to said predetermined level and again whenever said data signal remains at said predetermined level for said predetermined period of time.

5. The encoder of claim 4 wherein said means for switching said bistable means comprises a pair of serially connected one-shot multivibrators having a combined on-time selected to equal said predetermined period of time.

6. The encoder of claim 1 wherein said timing means comprises a bistable device for switching said bipolar means between said inverting and non-inverting modes; and means for switching said bistable device from one stable state to another, once when said data signal goes to said predetermined level and again if said data signal remains at said predetermined level for said predetermined period of time.

7. The encoder of claim 6 wherein said means for switching said bistable means comprises serially connected one-shot multivibrator means having an overall on-time selected to equal said predetermined period of time, and a gate having one input coupled to an output of said multivibrator means and another input coupled to receive a version of said data signal, whereby said gate supplies a pulse for reversing the state of said bistable device each time said data signal goes to said predetermined level and whenever said data signal remains at said predetermined level for said predetermined period of time.

8. In a limited bandwidth facsimile system including means for supplying a non-synchronous baseband signal having runs of unknown duration at first and second levels to represent black and white picture elements, respectively; a two-to-three level encoder comprising the combination of bipolar means selectively operable in inverting, non-inverting, and quiescent modes for generating an encoded version of said baseband signal; and control means coupled to said bipolar means for controlling the operating mode thereof in response to said baseband signal; said control means including means for holding said quiescent mode whenever said baseband signal is at one of said levels, and timing means triggered when said baseband signal goes to said one level for operating said bipolar means, during adjacent runs of said baseband signal at the other of said levels, in different ones of said inverting and non-inverting modes only if said runs occur within a predetermined period of time and otherwise in a selected one of said inverting and non-inverting modes.

9. The limited bandwidth facsimile system with the encoder according to claim 8 wherein said one and said other levels represent black and white picture elements, respectively, whereby runs of white picture elements are encoded with opposite polarities if separated by a run of black picture elements which is completed with said predetermined period of time and otherwise with the same polarity.

10. The limited bandwidth facsimile system with the encoder according to claim 9 wherein each of said picture elements is allotted a predetermined amount of time, and said predetermined period of time is selected to equal twice said amount of time, whereby adjacent runs of white picture elements straddling any single, isolated, black picture element are encoded with opposite polarities and other adjacent runs of white picture elements are encoded with the same polarity.

11. The limited bandwidth facsimile system with the encoder according to claim 8 wherein said timing means comprises a bistable device for selectively conditioning said bipolar means for operation in said inverting and non-inverting modes; and means coupled to said bistable device for switching said device from one stable state to another each time said baseband signal goes to said one level and again whenever said baseband signal remains at said one level for said predetermined period of time.

12. The limited bandwidth facsimile system with the encoder according to claim 11 wherein each of said picture elements is allotted a predetermined amount of time, said one and said other levels represent said black and white picture elements, respectively, and said time period is selected to equal twice the amount of time allotted to each picture element, whereby said bipolar means is operated in different ones of said inverting and non-inverting modes for encoding adjacent runs of white picture elements straddling any single, isolated, black picture element.

13. The limited bandwidth facsimile system with the encoder according to claim 8 wherein said bipolar means comprises an operational amplifier having inverting and non-inverting inputs, said timing means comprises a bistable device having a pair of complementary inputs, and said control means includes first and second coincidence gates having first inputs coupled to different ones of the outputs of said bistable device, and outputs coupled to the inverting and non-inverting inputs, respectively, of said operational amplifier, whereby one of said gates is enabled and the other is disabled whenever said baseband signal goes to said other level, thereby operating said operational amplifier in a selected one of said inverting and non-inverting modes when said baseband signal is at said other level.

14. The limited bandwidth facsimile system with the encoder according to claim 13 wherein said timing means further includes means for switching said bistable device from one stable state to another, once when said baseband signal goes to said one level and again if said baseband signal remains at said level for said predetermined period of time.

15. The limited bandwidth facsimile system with the encoder according to claim 14 wherein said one and said other levels represent black and white picture elements, respectively, whereby said operational amplifier operates in different ones of said inverting and non-inverting modes for encoding adjacent runs of white picture elements occurring within said predetermined period of time and in a selected one of said inverting and non-inverting modes for encoding other adjacent runs of white picture elements.

16. The limited bandwidth facsimile system with the encoder according to claim 14 wherein said means for switching said bistable device includes one-shot multivibrator means for supplying a switching pulse for said bistable device whenever said baseband signal remains at said one level for said predetermined time period.

17. The limited bandwidth facsimile system with the encoder according to claim 16 wherein each of said picture elements is allotted a predetermined amount of time, said one and said other levels represent white and black picture elements, respectively, and said period of time is selected to equal twice the amount of time allotted to each of the picture elements, whereby said operational amplifier operates in a selected one of said inverting and non-inverting modes for encoding any adjacent runs of white picture elements separated by plural black picture elements and in different ones of said inverting and non-inverting modes for encoding any adjacent runs of white picture elements separated by a single black picture element.

18. The limited bandwidth facsimile system with the encoder according to claim 17 wherein said multivibrator means comprises a plurality of serially connected one-shot multivibrators having an overall on-time equal to twice the amount of time allotted to each of said picture elements; and further including gate means having one input coupled to receive a version of said baseband signal, another input coupled to receive said switching pulse and an output coupled to said bistable device, whereby the state of said bistable device is reversed each time said baseband signal goes to said one level and whenever said baseband signal remains at said one level for a period equal to twice the amount of time allotted to each picture element.

19. A method for generating a three level encoded signal in response to a data signal having successive runs of unknown length at first and second levels; said method comprising the steps of holding the encoded signal at mid-level whenever said data signal is at said first level;

adjusting the encoded signal to a selected one of an upper level and a lower level whenever the data signal goes to said second level; and selecting the same and different ones of said upper and lower levels for encoding adjacent runs of said data signal at said second level when said adjacent runs are separated by and occur within, respectively, a predetermined period of time.

20. The method of claim 19 wherein said data signal is a facsimile baseband signal having black and white picture elements represented by said first and second levels, respectively, whereby said encoded signal passes through said mid-level while encoding adjacent runs of black picture elements to thereby aid in recovering any short runs of black picture elements.

21. The method of claim 20 wherein each of said picture elements is allotted a predetermined period of time, and said predetermined time period is selected to equal twice the amount of time allotted to each picture element, whereby any change of said encoded signal from one of said upper and lower levels to the other uniquely and positively identifies a single, isolated, black picture element.

* * * * *